US008457675B2

(12) United States Patent
Miyabayashi

(10) Patent No.: US 8,457,675 B2
(45) Date of Patent: Jun. 4, 2013

(54) WIRELESS COMMUNICATION APPARATUS AND METHOD

(75) Inventor: Naoki Miyabayashi, Tokyo (JP)

(73) Assignee: Sony Corporation, Tokyo (JP)

( * ) Notice: Subject to any disclaimer, the term of this patent is extended or adjusted under 35 U.S.C. 154(b) by 717 days.

(21) Appl. No.: 11/654,760

(22) Filed: Jan. 17, 2007

(65) Prior Publication Data
US 2007/0201344 A1 Aug. 30, 2007

(30) Foreign Application Priority Data
Jan. 26, 2006 (JP) ................................. 2006-017885

(51) Int. Cl.
*H04J 3/00* (2006.01)

(52) U.S. Cl.
USPC .................... 455/522; 455/127.5; 455/550.1; 370/336; 370/345

(58) Field of Classification Search
USPC ............. 370/310, 336, 345; 455/127.5, 522, 455/550.1
See application file for complete search history.

(56) References Cited

U.S. PATENT DOCUMENTS

| | | | | |
|---|---|---|---|---|
| 6,151,328 A * | 11/2000 | Kwon et al. | ................... | 370/441 |
| 6,351,499 B1 * | 2/2002 | Paulraj et al. | ................... | 375/267 |
| 6,871,046 B2 * | 3/2005 | Kitagawa et al. | ............... | 455/17 |
| 6,985,434 B2 * | 1/2006 | Wu et al. | ........................ | 370/208 |
| 7,187,646 B2 * | 3/2007 | Schramm | ....................... | 370/206 |
| 7,245,879 B2 * | 7/2007 | Sadri et al. | ................. | 455/67.11 |
| 7,280,504 B2 * | 10/2007 | Sato | ............................. | 370/330 |
| 7,321,563 B2 * | 1/2008 | Kim et al. | ..................... | 370/252 |
| 7,460,876 B2 * | 12/2008 | Sadri et al. | .................... | 455/522 |
| 7,468,962 B2 * | 12/2008 | Belotserkovsky et al. | ... | 370/329 |
| 7,515,875 B2 * | 4/2009 | Horisaki | ......................... | 455/59 |
| 7,522,544 B2 * | 4/2009 | Cheng et al. | .................. | 370/310 |
| 7,564,813 B2 * | 7/2009 | Lee et al. | ...................... | 370/329 |
| 7,570,578 B2 * | 8/2009 | Kasami et al. | ................. | 370/206 |
| 7,570,953 B2 * | 8/2009 | Maltsev et al. | ................ | 455/450 |
| 2002/0090008 A1 * | 7/2002 | Cioffi et al. | .................... | 370/503 |
| 2003/0016123 A1 * | 1/2003 | Tager et al. | .............. | 340/310.01 |
| 2004/0176033 A1 * | 9/2004 | Tamaki et al. | ................... | 455/59 |
| 2005/0030887 A1 * | 2/2005 | Jacobsen et al. | .............. | 370/208 |
| 2005/0031047 A1 * | 2/2005 | Maltsev et al. | ................. | 375/260 |
| 2008/0056181 A1 * | 3/2008 | Imamura et al. | .............. | 370/329 |
| 2009/0221297 A1 * | 9/2009 | Wengerter et al. | ............ | 455/453 |

FOREIGN PATENT DOCUMENTS

| | | |
|---|---|---|
| JP | 2001-186102 | 12/1999 |
| JP | 2000-332723 | 11/2000 |
| JP | 2002-237795 | 8/2002 |
| JP | 2003-152671 | 5/2003 |
| JP | 2003-304214 | 10/2003 |
| JP | 2004-266685 | 9/2004 |
| JP | 2005-045505 | 2/2005 |

* cited by examiner

*Primary Examiner* — Steven Kelley
(74) *Attorney, Agent, or Firm* — Robert J. Depke; The Chicago Technology Law Group, LLC

(57) ABSTRACT

A wireless communication apparatus that transmits and receives an orthogonal frequency division multiplexing signal to communicate with a communication counterpart, the wireless communication apparatus including measurement means for measuring the signal level of each subcarrier of the reception signal received from the communication counterpart, calculation means for calculating a predicted signal level of each subcarrier when the communication counterpart receives the signal based on the signal level of each subcarrier of the reception signal measured by the measurement means and calculating an increase/decrease rate of transmission power for each subcarrier such that the average amount of limited mutual information limited by the modulation method for the signal is maximized based on the predicted signal level, and transmission parameter control means for controlling transmission parameters including the increase/decrease rate of transmission power for each subcarrier calculated by the calculation means.

4 Claims, 9 Drawing Sheets

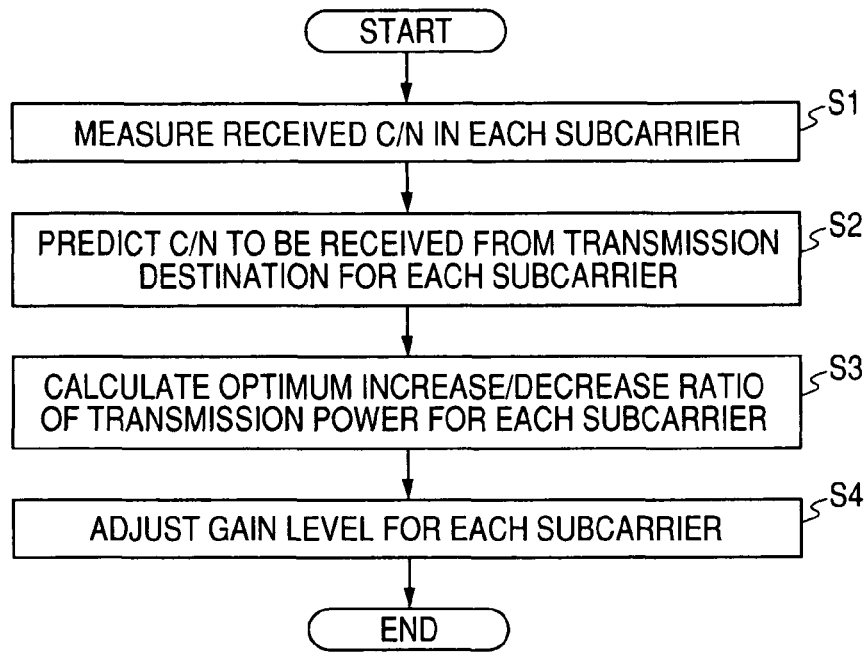
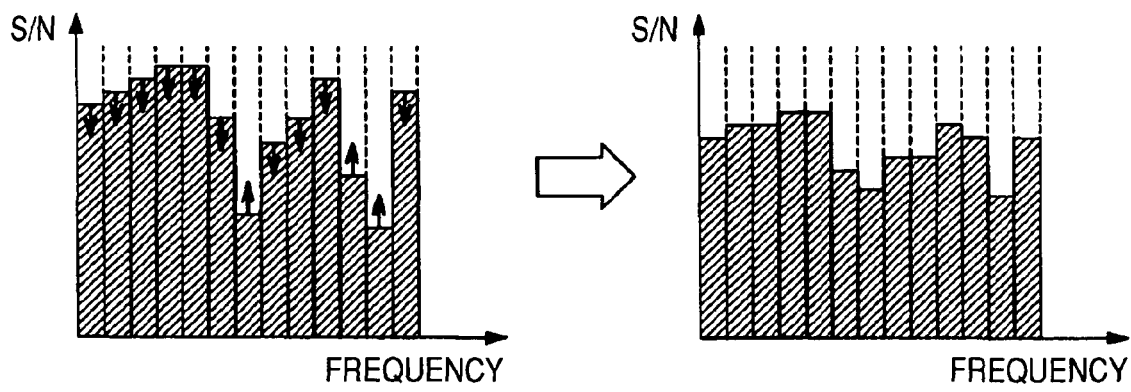

BER IN BPSK (1/2)

BER IN BPSK (3/4)

BER IN QPSK (1/2)

BER IN QPSK (3/4)

WIRELESS COMMUNICATION APPARATUS AND METHOD

CROSS REFERENCES TO RELATED APPLICATIONS

The present invention contains subject matter related to Japanese Patent Application JP 2006-017885 filed in the Japanese Patent Office on Jan. 26, 2006, the entire contents of which being incorporated herein by reference.

BACKGROUND OF THE INVENTION

1. Field of the Invention

The present invention relates to an orthogonal frequency division multiplexing (OFDM) wireless communication apparatus and method.

2. Description of the Related Art

In recent years, there have been widely used communication instruments equipped with OFDM (Orthogonal Frequency Division Multiplexing) modulation technologies, such as a wireless LAN (Local Area Network) represented by IEEE 802.11a/g, and IEEE 802.16 or WiMax. Most of the communication instruments are mounted on battery-driven terminals, so that there is a need to minimize power consumption while ensuring stable communication quality and high throughput.

To meet such conflicting requirements, attention is given to adaptive control of transmission power. In the most simplified example, a pair of transmitting and receiving terminals communicate with each other using low power when they are within a short transfer distance, and necessary transmission power will be added as the distance between them increases, so as to minimize the transmission power.

Multipath resulting from various reflective objects, such as walls and ground, is present on an actual wireless transmission line, resulting in frequency selective fading. In FIG. 9 showing a specific example, when transmission power is sent at a uniform power density for a certain frequency band, a large number of delayed waves due to the multipath impair the uniformity of the power density in the reception spectrum.

Consider now how the fading phenomenon affects the OFDM. Since the OFDM is formed of a large number of narrowband carriers (hereinafter referred to as subcarriers), the amount of signal attenuation of one subcarrier will differ from those of other subcarriers, resulting in subcarrier-to-subcarrier variance in error characteristic. Accordingly, it will be difficult to keep an error-free state for all subcarriers.

To increase the reception sensitivity, any one of the following actions is necessary: adding extra transmission power, reselecting more error-resistant modulation method, or adjusting the error coding rate. However, any one of the above actions forces increased power consumption or reduced frequency efficiency.

JP-A-2005-45505 proposes a method in which transmission power for each subcarrier is increased or decreased on the transmitting side such that variation in reception level for each subcarrier is reduced on the receiving side, and when such a control does not provide a desired reception quality, extra uniform transmission power will be added for all transmission power.

JP-A-2001-186102 proposes a method in which in multi-carrier communication, higher transmission power and more transmission bits are allocated to a carrier with less noise, while transmission power is reduced for a carrier with more noise, so as to reduce the number of the transmission bits.

JP-A-2004-266585 proposes a method in which in multi-carrier communication, higher transmission power is allocated to a carrier having a higher S/N ratio to keep the sum of the signal power and the noise power constant based on the water filling theorem, while lower power is allocated to a carrier having a lower S/N ratio. In JP-A-2004-266585, the optimum power distribution is carried out based on the same theorem along the time axis as well as the frequency axis.

The common feature in JP-A-2001-186102 and JP-A-2004-266585 is that the number of transmittable bits for all subchannels is maximized by distributing transmission power in an optimum manner and maximizing the total channel capacity of all subcarriers. That is, even when the total transmission power is constant, the methods described in JP-A-2001-186102 and JP-A-2004-266585 are used to perform optimizing control of transmission power distribution per unit frequency and unit time, so as to increase the throughput.

SUMMARY OF THE INVENTION

However, an actual multipath transmission line may have a band where a signal is substantially attenuated, called deep fading. Therefore, the method described in JP-A-2005-45505 reduces variation in power received by all subchannels including a deep fading-affected subchannel, so that substantial transmission power will be allocated to compensate for the subchannel where the signal has been substantially attenuated. Considering that many of communication systems have error correction ability so that an error correction code corrects an error bit caused by the deep fading, the extra transmission power allocated to the subcarrier will be wasted.

In the present wireless LAN communication standard, since the number of bits allocated to one subcarrier is not permitted to be different from those allocated to the other subcarriers, it is not possible to carry out optimum bit allocation appropriate to the channel capacity for each subcarrier. Furthermore, in the communication system contemplated in JP-A-2001-186102 and JP-A-2004-266585, no consideration is given to the effect of the error correction code, which plays an important role as a technology that ensures the communication quality of the present wireless communication, on the error rate characteristic. Therefore, in the present wireless LAN systems, the channel capacity maximizing control described above is not the best method for maximizing the throughput and improving the error rate characteristic.

In view of the above, it is desirable to provide a wireless communication apparatus and method for improving the packet error rate without increasing transmission power in a frequency selective fading environment.

According to an embodiment of the invention, there is provided a wireless communication apparatus that transmits and receives an orthogonal frequency division multiplexing signal to communicate with a communication counterpart. The wireless communication apparatus includes measurement means for measuring the signal level of each subcarrier of the reception signal received from the communication counterpart, calculation means for calculating a predicted signal level of each subcarrier when the communication counterpart receives the signal based on the signal level of each subcarrier of the reception signal measured by the measurement means and calculating an increase/decrease rate of transmission power for each subcarrier such that the average amount of limited mutual information limited by the modulation method for the signal is maximized based on the predicted signal level, and transmission parameter control means for controlling transmission parameters including the increase/decrease rate of transmission power for each subcarrier calculated by the calculation means.

According to another embodiment of the invention, there is provided a wireless communication apparatus that transmits and receives an orthogonal frequency division multiplexing signal to communicate with a communication counterpart. The wireless communication apparatus includes measurement means for measuring the signal level of each subcarrier of the reception signal received from the communication counterpart, calculation means for calculating a predicted signal level of each subcarrier when the communication counterpart receives the signal based on the signal level of each subcarrier of the reception signal measured by the measurement means, calculating a threshold value based on the predicted signal level and calculating an increase/decrease rate of transmission power for each subcarrier based on the comparison result of the threshold value and the predicted signal level, and transmission parameter control means for controlling transmission parameters including the increase/decrease rate of transmission power for each subcarrier calculated by the calculation means.

According to another embodiment of the invention, there is provided a wireless communication method for transmitting and receiving an orthogonal frequency division multiplexing signal to communicate with a communication counterpart. The wireless communication method includes the steps of measuring the signal level of each subcarrier of the reception signal received from the communication counterpart, calculating a predicted signal level of each subcarrier when the communication counterpart receives the signal based on the signal level of each subcarrier of the reception signal measured at the measuring step and calculating an increase/decrease rate of transmission power for each subcarrier such that the average amount of limited mutual information limited by the modulation method for the signal is maximized based on the predicted signal level, and controlling transmission parameters including the increase/decrease rate of transmission power for each subcarrier calculated at the calculating step.

According to another embodiment of the invention, there is provided a wireless communication method for transmitting and receiving an orthogonal frequency division multiplexing signal to communicate with a communication counterpart. The wireless communication method includes the steps of measuring the signal level of each subcarrier of the reception signal received from the communication counterpart, calculating a predicted signal level of each subcarrier when the communication counterpart receives the signal based on the signal level of each subcarrier of the reception signal measured at the measuring step, calculating a threshold value based on the predicted signal level and calculating an increase/decrease rate of transmission power for each subcarrier based on the comparison result of the threshold value and the predicted signal level, and controlling transmission parameters including the increase/decrease rate of transmission power for each subcarrier calculated at the calculating step.

According to an embodiment of the invention, the error rate characteristic can be improved without increasing the transmission power even on a transmission line where multipath is present.

BRIEF DESCRIPTION OF THE DRAWINGS

FIG. 3 is a flowchart which indicates a method for setting an optimum increase/decrease ratio determination for each subcarrier;

FIG. 4 illustrates transmission power distribution for each subcarrier in the first embodiment;

DESCRIPTION OF THE PREFERRED EMBODIMENTS

Specific embodiments of the invention will be described below in detail with reference to the drawings. Firstly, transmission power distribution to each subcarrier in OFDM (Orthogonal Frequency Division Multiplexing) communication will be described with reference to a paper (E. Malkamaki and H. Leib, "Coded Diversity on Block-Fading Channels", in IEEE Trans. Inform. Theory, vol. 45, No. 2, pp. 771781, 1999). This paper describes the packet error rate when a signal is attenuated due to fading in a multicarrier system to which random coding is applied.

Figure 1:
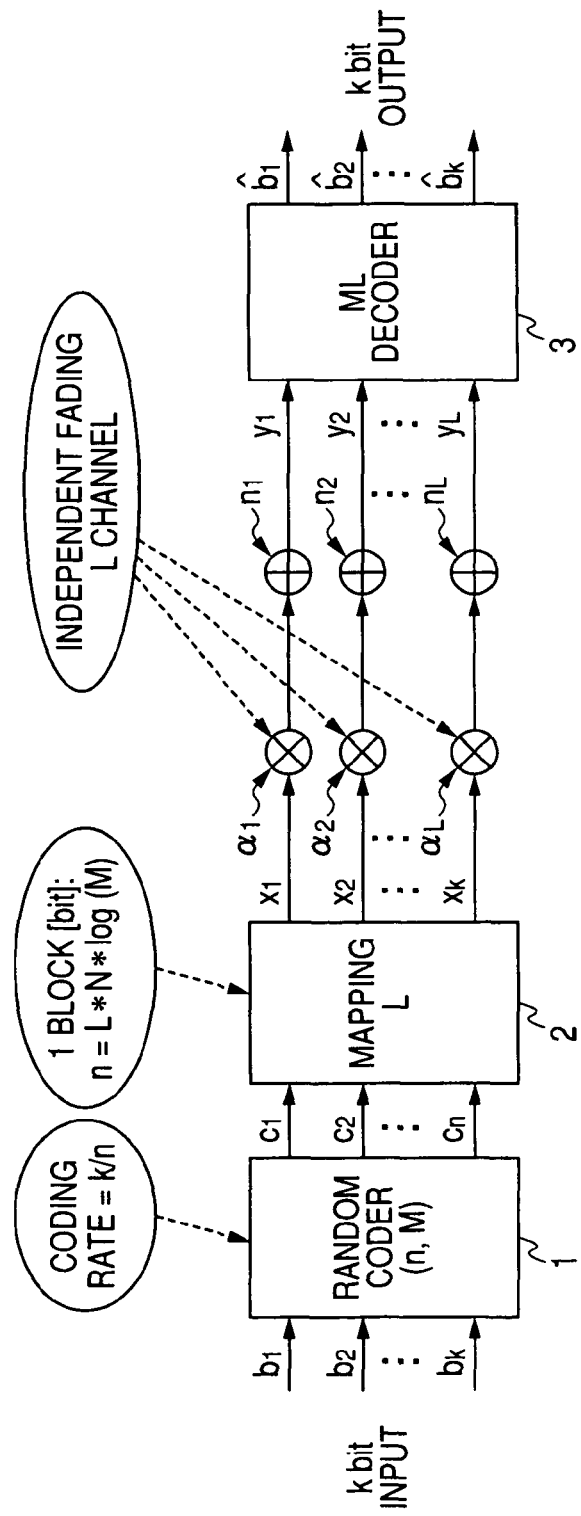
FIG. 1 illustrates a multicarrier communication system.

FIG. 1 diagrammatically shows the multicarrier communication system. A random coder 1 converts bit series $b_1$ to $b_k$ of a k-bit input data into n-bit code words $c_1$ to $c_n$ according to a modulation method M and a coding rate R (k/n) These code words $c_1$ to $c_n$ are handled as a packet having a size of n (n=LN log(M)). In a mapping section 2, each bit of the packet is mapped to the number of subcarriers L and the length of the packet N, and is BPSK modulated for each subcarrier for multicarrier transmission.

Along the transmission line, the signal of each subcarrier xi suffers signal attenuation at an attenuation rate αi due to fading, and white noise ni on the transmission line is superimposed. Let α=[α1, α2, ..., αL] be the fading attenuation rates of all carriers expressed in the form of a vector, and assume that the probability distribution of each element αi follows the Rice distribution.

The received n-bit signal is BPSK demodulated and then undergoes error correction in a maximum likelihood decoder 3, resulting in the k-bit data.

In such a multicarrier communication system, when the size (packet length multiplied by the number of carriers) of one packet to be sent is sufficiently large, the packet error rate Pe can be approximated by the following equation:

$$\lim_{n \to \infty} Pe(R, N, L) = Pr[C_L(\alpha) < R] \quad (1)$$

where $C_L$ represents the average amount of mutual information C(αi) of the subcarriers.

$$C_L(\alpha) = \frac{1}{N} \sum_{i=1}^{N} C(\alpha_i) \quad (2)$$

In general, the amount of mutual information on the transmission line is limited to the channel capacity, log 2(1+s/n). However, the modulation method for each subcarrier is fixed, so that the amount of mutual information is limited to the number of transmission bits as the upper limit used in the modulation method (hereinafter referred to as the amount of limited information). In this description, since each subcarrier is BPSK modulated, the amount of maximum mutual information is 1 bit/Hz. R denotes the amount of transmitted information. In this description, the modulation method is BPSK and the number of transmission bits for each subcarrier is 1 bit, so that the coding rate simply becomes the amount of transmitted information. That is, the equation (1) means that, provided that each subcarrier has an attenuation rate of αi, the reception will be successful when the amount of limited information $C_L$ of the subcarrier is larger than the amount of transmitted information R, while the reception will be unsuccessful when the amount of limited information $C_L$ of the subcarrier is smaller than the amount of transmitted information R. The packet error rate represents the average error occurrence probability for the subcarriers.

This paper compares the theoretical analysis result for the upper limit of the random code error rate with the simulation result using a convolutional code with a constraint length of 7 (an error correction technology similar to that used in a wireless LAN). The comparison result states that when the Rician Factor is small, the theoretical curve and the simulation curve well agree with each other, and the difference therebetween is suppressed within 2 to 3 dB even under the condition of AWGN (Additive White Gaussian Noise), which will generate the largest difference. Therefore, even when a convolutional code is used, the relationship between the amount of limited information and the error rate characteristic widely holds true.

The wireless communication apparatus shown as a specific example of the invention optimizes the transmission power distribution to subchannels to improve the packet error characteristic without increasing the total power for all subcarriers.

First Embodiment

Figure 2:
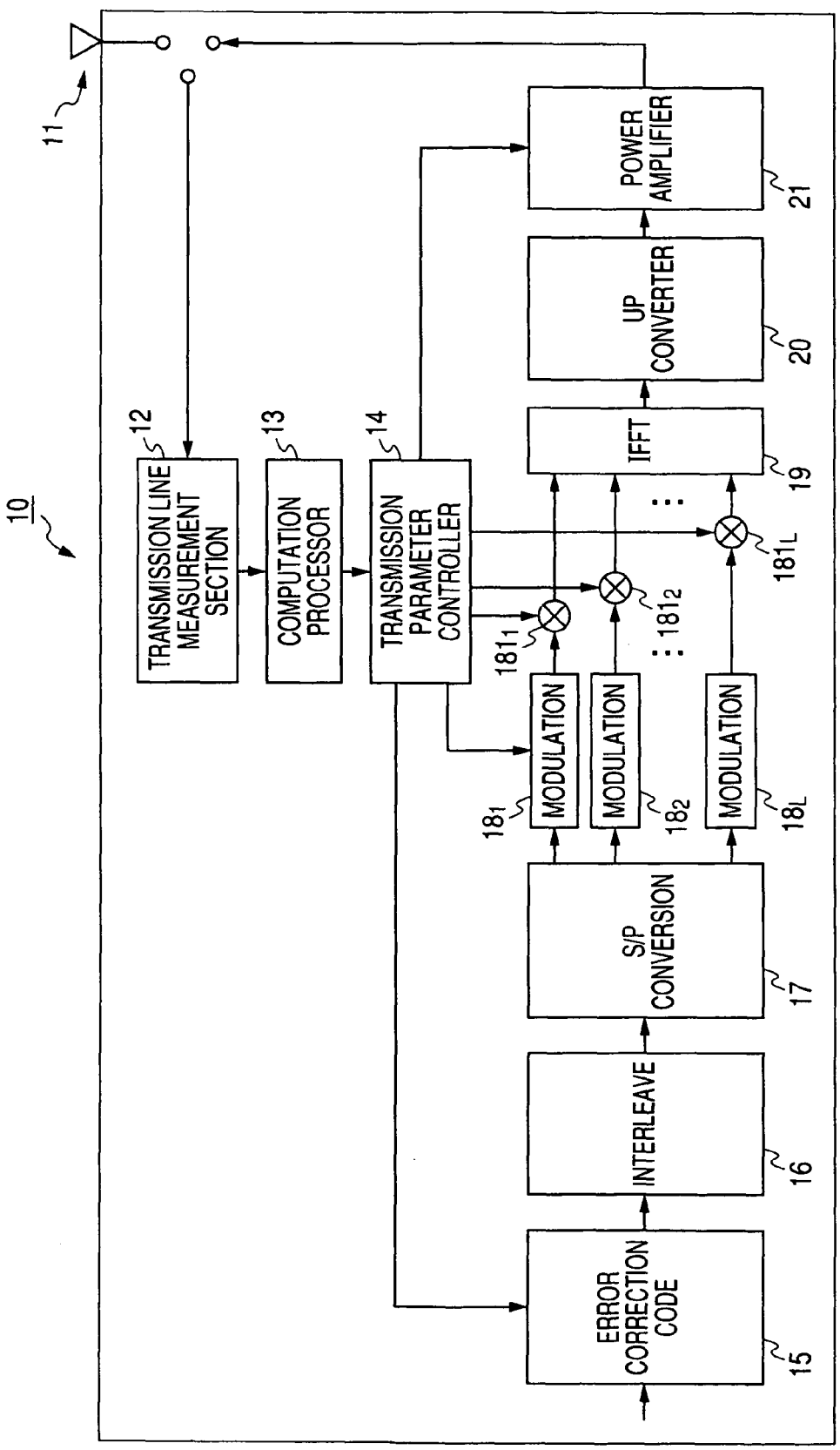
FIG. 2 is a block diagram illustration indicating the configuration of the wireless communication apparatus according to the first embodiment.

FIG. 2 is a block diagram showing the configuration of the wireless communication apparatus according to a first embodiment. A wireless communication apparatus 10 includes a transceiver antenna 11, a transfer line measuring section 12, a computation processor 13, a transmission parameter controller 14, an error correction coder 15, an interleave processor 16, a serial/parallel (S/P) converter 17, subcarrier modulators $18_1$ to $18_L$, an IFFT (Inverse Fast Fourier Transformation) section 19, an up converter 20 and a power amplifier 21.

The transceiver antenna 11 uses multiple carriers (multicarriers) to transmit and receive a multicarrier transmission signal obtained by frequency multiplexing multiple transmission pulses.

The transfer line measuring section 12 measures the multicarrier transmission signal inputted from the transceiver antenna 11 to acquire transmission line information. Specifically, the transfer line measuring section 12 measures C/N for each subcarrier and calculates the average C/N value to acquire the average amount of signal attenuation generated along the transmission line. The transmission line measuring section 12 also measures the packet error rate in the received multicarrier transmission signal.

The computation processor 13 calculates the increase/decrease rate for each subcarrier, the error correction code rate, the modulation method, the output of the power amplifier 21 and the like based on the transmission line information acquired by the transmission line measuring section 12. For example, the increase/decrease rate for each subcarrier is calculated such that the average amount of limited information is maximized, as described later.

The transmission parameter controller 14 outputs the transmission parameters calculated in the computation processor 13, that is, the error correction code rate, the modulation method, the increase/decrease rate for each subcarrier and the output of the power amplifier 21, to the subcarrier modulators $18_1$ to $18_L$, multipliers $181_1$ to $181_L$ and the power amplifier 21, respectively.

The error correction coder 15 performs error correction coding on inputted baseband data.

The interleave processor 16 interleaves the data that has undergone the correction coding in order to prevent reduction in error correction gain due to local errors, such as a burst noise.

The serial/parallel (S/P) converter 17 converts the interleaved serial-series data into L (the number of subchannels) parallel signals.

The subcarrier modulators $18_1$ to $18_L$ modulate each data that has been converted into each of the L (the number of subchannels) parallel signals. The multipliers $181_1$ to $181_L$ redistribute the transmission power among the subcarriers according to the increase/decrease rates.

The IFFT (Inverse Fast Fourier Transformation) section 19 performs inverse fast Fourier transformation on the plurality of parallel subcarrier modulated waves to which the transmission power has been redistributed so as to generate one multicarrier transmission signal.

The up converter 20 up-converts the multicarrier transmission signal to a predetermined frequency band.

The power amplifier 21 provides a predetermined gain to the up-converted multicarrier transmission signal.

To transmit data, the error correction coder 15 performs error correction coding on the baseband data, which is interleaved by the interleave processor 16. Then, the S/P converter 17 converts the serial-series data into L (the number of subchannels) parallel signals, and each of the parallel data is modulated by the respective subcarrier modulators $18_1$ to $18_L$. These L parallel modulated waveforms undergo inter-subcarrier transmission power redistribution according to the increase/decrease rate set to each waveform. The IFFT 19 performs inverse fast Fourier transformation on the plurality of parallel subcarrier modulated waves to which the transmission power has been redistributed so as to generate one multicarrier transmission signal. Thereafter, the up converter 20 up-converts the output waveform of the multicarrier transmission signal to the frequency band at which the signal is actually transmitted. Then, the power amplifier 21 provides necessary gain to the signal, which is sent from the transceiver antenna 11 onto the transmission line.

The process for setting optimum transmission parameters will now be described with reference to the flowchart shown in FIG. 3.

At the step S1, the transmission line measuring section 12 uses the transceiver antenna 11 to receive a multicarrier transmission signal sent from a communication counterpart and measures the received signal to acquire transmission line information. Specifically, the transmission line measuring section 12 measures C/N values, γpre(1), γpre(2), ..., γpre(L) for each subcarrier of the multicarrier transmission signal and calculates the average C/N value γpre_avg.

At the step S2, the transmission line measuring section 12 obtains the average amount of signal attenuation Ploss (dB) generated along the transmission line using any one of the following methods. In the first method, the channel measurement request set forth in the IEEE 802.11h standard is carried out to receive a reception result report packet from the communication counterpart and calculates the average amount of signal attenuation Ploss (dB) generated along the transmission line. In the second method, by assuming that the transmission line is symmetrical in transmission and reception and calculating the difference between the directly measured C/N value and the transmission power level at the communication counterpart, the average amount of signal attenuation Ploss (dB) along the transmission line is obtained. In the third method, by compiling the transmitted packet error rate and the modulation method when the packet was transmitted, the reception C/N at the communication counterpart is predicted to calculate the average amount of signal attenuation Ploss (dB).

The computation processor 13 uses the average C/N value γpre_avg, which is the transmission line information, to calculate the optimum modulation method M-QAM, the error correction code rate and the output of the power amplifier Ppa (dBm). These transmission parameters can be determined by using a parameter derivation method in which the average C/N value γpre_avg and the modulation method M-QAM, the error correction code rate and the output of the power amplifier Ppa are used as arguments to calculate respective predicted packet error rates from the theoretical equation for the packet error rate under the condition of AWGN, and the calculation results for respective arguments are compared to determine the optimum transmission parameters. When transmission line information, such as the average C/N value and the packet error rate, is used as the input, the computation processor 13 can have an inner table in advance from which the optimum transmission parameters (the modulation method M-QAM, the error correction code rate and the output of the power amplifier Ppa) are obtained, allowing reduced calculation load and efficient derivation.

At the step S3, the computation processor 13 calculates an optimum increase/decrease rate of the transmission power for each subcarrier based on the transmission line information acquired from the transmission line measuring section 12, as will be described later. Specifically, the C/N value γpre(i) for each subcarrier i measured by the transmission line measuring section 12 and the average C/N value γpre_avg as well as the equation (3) are used to calculate a predicted reception level γi for each subcarrier on the communication counterpart side, and the predicted reception level γi for each subcarrier is used to determine the increase/decrease rate of the transmission power for each subcarrier.

$$\gamma i = Ppa - Ploss + \gamma pre(i) - \gamma pre\_avg \quad (3)$$

At the step S4, the computation processor 13 adjusts the gain level for each subcarrier. Since the average amount of signal attenuation Ploss (dB) calculated at the step S2 contains an error, γi calculated by the above equation (3) will also contain an error, and the increase/decrease rate P(γi) of the transmission power that will be ultimately obtained will naturally contain an error. To address this problem, this error is minimized and then the transmission parameters are set again. Specifically, when the packet error rate measured by the transmission line measuring section 12 is larger than a predicted value, ΔPloss is added to Ploss for correction, while when the packet error rate is smaller than the predicted value, ΔPloss is subtracted from Ploss for correction. Then, the newly calculated Ploss is used to acquire the reception signal level γi from the above equation (3) and acquire the final updated increase/decrease rate P(γi) of the transmission power.

The increase/decrease rate for each subcarrier, the error correction code, the modulation method, the amplification factor of the power amplifier and the like thus obtained by the computation processor 13 are transferred by the transmission parameter controller 14 to each function block and used for setting.

Next, the process for deriving the increase/decrease rate for each subcarrier calculated by the computation processor 13 will be described. FIG. 4 is a conceptual view showing transmission power distribution to each subcarrier in the first embodiment. As described with reference to the above equation (2), the error rate in the multicarrier communication is determined by the amount of limited mutual information carried by a subcarrier. In other words, by optimizing the transmission power distribution to each subcarrier to satisfy the equation (4) and maximizing the average amount of limited information, the error rate can be reduced.

$$C_{opt} = \max\left(\frac{1}{L}\sum_{i=1}^{L} C_i\right), \quad (4)$$

$0 \leq i \leq L$, where L is the number of subcarriers.

As a result, even when the total transmission power is fixed, the error rate can be reduced and the throughput can be improved.

Figure 5:
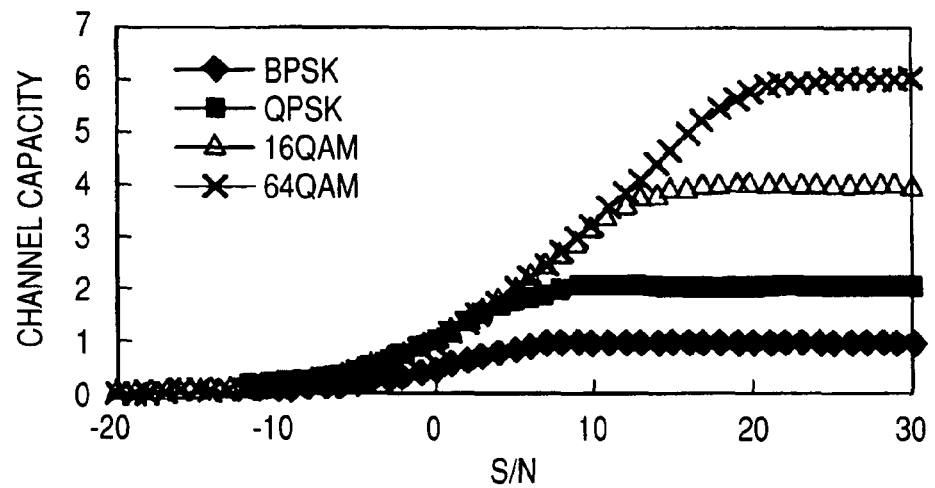
FIG. 5 is a graph illustrating the relationship between channel capacity and Signal to Noise ratio.

In the IEEE 802.11a/g communication standard, the modulation method can be chosen from BPSK, QPSK, 16QAM and 64QAM, and the modulation method contributes to determination of the limit of the amount of mutual information. Specifically, each of the modulation methods permits the amount of mutual information shown in FIG. 5, that is, up to 1 bit for BPSK, 2 bits for QPSK, 4 bits for 16QAM and 6 bits for 64QAM. The relationship between the amount of mutual information and the S/N ratio can be approximated by the following equations for the respective modulation methods.

$$C_{BPSK} = 1 - \exp(-0.62\gamma)$$

$$C_{QPSK} = 2 \times (1 - \exp(-0.62\gamma))$$

$$C_{16QAM} = 4 \times (1 - \exp(-0.25\gamma^{0.8}))$$

$$C_{64QAM} = 6 \times (1 - \exp(-0.2\gamma^{0.6})) \tag{5}$$

These equations can be further generalized to derive the equation (6).

$$C_{M-QAM} = \log_2(M) \times (1 - \exp(-m_M \times \gamma^{h_M})) \tag{6}$$

where M is the constellation number, and mM and hM are coefficients that depend on M.

The maximum value of the equation (4) can be determined by solving the Lagrange equation. Consider now a general method for determining the maximum value of a hyperplane function f(x) under the equality constraint condition g(x)=0. Letting $x_{opt}$ be the desired optimum solution (maximum value), slight movement of $x_{opt}$ should not change the f(x) value under the constraint condition of g(x) because $x_{opt}$ is at the local maximum point on the hyperplane f(x). Also, the hyperplane and the hypersurface g(x)=0 share a tangential plane (hyperplane), at the point $x_{opt}$, so that the normal vectors Δf and Δg of these hypersurfaces become parallel at the point $x_{opt}$. In such a case, it is known that the following equation holds true by using an appropriate constant λ.

$$\Delta f + \lambda \Delta g = 0 \tag{7}$$

Furthermore, by assuming the Lagrange equation L to be the equation (8), the partial differential equation Lagrangian holds true.

$$L(\lambda, x) = f(x) + \lambda g(x) \tag{8}$$

$$\frac{\partial L(x)}{\partial x} = 0 \tag{9}$$

To determine the maximum value of the equation (4), the constraint term is first assumed to be the equation (10), which is then assumed to be the Lagrange equation, allowing the optimum solution (maximum value) of the equation (4) to be obtained.

$$P_{avg} = \sum_{i=1}^{L} \frac{P(\gamma_i^{h_M})}{L} \tag{10}$$

$$J(P(\gamma_i)) = \log_2(M) - \exp\left(-m \cdot \gamma_i^{h_M} \cdot \frac{P(\gamma_i)}{P_{avg}}\right) - \lambda \cdot \left\{\sum_{i=1}^{L} \frac{P(\gamma_i)}{L} - P_{avg}\right\} \tag{11}$$

That is, P(γi) obtained when Lagrangian, the differential coefficient of the Lagrange equation, becomes zero is the solution that maximizes the equation (4).

$$\frac{\partial J(P(\gamma_i))}{\partial P(\gamma_i)} = m \cdot \gamma_i^{h_M} \cdot \exp\left(-m \cdot \gamma_i^{h_M} \cdot \frac{P(\gamma_i)}{P_{avg}}\right) - \frac{\lambda}{N} \tag{12}$$

Then, the optimum solution will be given by the equation (13).

$$P_{t_i} = \frac{\log(\gamma_i^{h_M})}{m_M \cdot \gamma_i^{h_M}} - \frac{\sum_{i=1}^{N} \frac{\log(\gamma_i^{h_M})}{m_M \cdot \gamma_i^{h_M}} - N}{\sum \frac{1}{\gamma_i^{h_M}}} \cdot \frac{1}{\gamma_i^{h_M}} \tag{13}$$

Since no negative Pti exists, the condition of the equation (14) is applied to identify the subcarrier to which zero power will be distributed.

$$P(\gamma_i) = \begin{cases} P_{t_i}, & \text{if } P_{t_i} > 0, \\ 0 & \text{if } P_{t_i} \leq 0 \end{cases} \tag{14}$$

Then, the above equation (13) is used to recalculate the optimum solution only for a subcarrier to which power will be distributed, and the P(γi) ultimately obtained is set to the optimum increase/decrease rate for the subcarrier.

Second Embodiment

The wireless communication apparatus according to a second embodiment is realized by using component blocks similar to those in the first embodiment shown in FIG. 2. Therefore, the process in which the error correction coder 15 performs error coding on transmission data, which is then sent onto the transmission line via the transceiver antenna 11 is carried out in a process similar to that in the first embodiment. In the second embodiment, the computation processor 13 is used to implement a method for deriving subcarrier transmission power, which is easier than the method used in the first embodiment in terms of the procedure of setting the transmission parameters.

Figure 6:
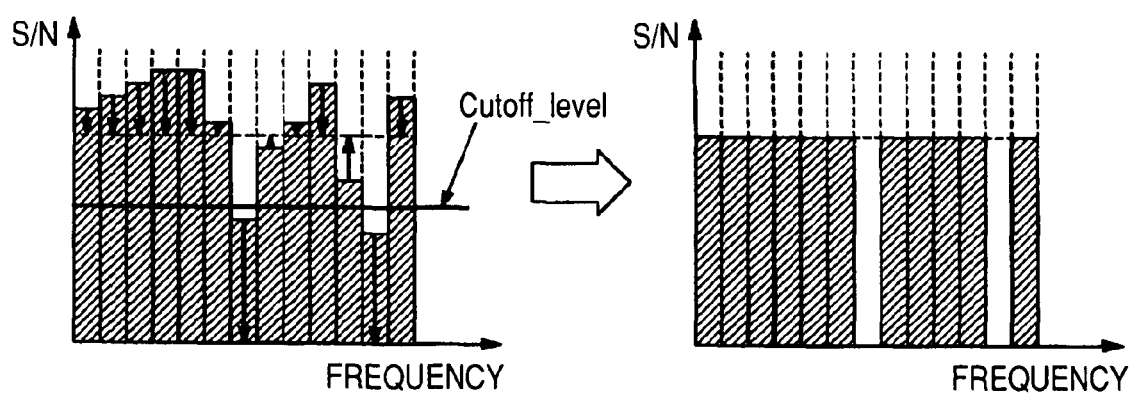
FIG. 6 illustrates a transmission power distribution for each subcarrier according to the second embodiment.

FIG. 6 is a conceptual view showing transmission power distribution to each subcarrier in the second embodiment. As shown in FIG. 6, in the second embodiment, the increase/decrease rate of the transmission power for each subcarrier is adjusted such that the power distribution to a subcarrier having an S/N ratio smaller than a cutoff_level is set to zero and the power received by the remaining subcarriers is uniform.

Firstly, the above equation (3) is used to determine the predicted reception level γi for each subcarrier on the communication counterpart side based on the transmission line information obtained by the transmission line measuring section 12. The subcarrier reception level γi is used to define the cutoff_level as expressed by the equation (15).

$$\text{cutoff\_level} = \frac{1}{1 + \frac{1}{L}\sum_{i=1}^{L} \frac{1}{\gamma_i}} \tag{15}$$

Then, by applying the conditions (16), the increase/decrease rate of the transmission power for each subcarrier is adjusted such that the power distribution to a subcarrier having an S/N ratio smaller than the cutoff_level is set to zero and the power received by the remaining subcarriers is uniform.

$$\gamma_{inv}(i) = \begin{cases} 1/\gamma_i, & \text{if } \gamma_i > \text{cutoff-level} \\ 0, & \text{else} \end{cases} \quad (16)$$

$$Pt(i) = \frac{\gamma_{inv}(i)}{L \cdot \sum_{i=1}^{L} \gamma_{inv}(i)} \quad (17)$$

The error correction coder 15, the subcarrier modulators 18$_1$ to 18$_L$ and the method for determining the amplification factor of the power amplifier 21 are similar to those in the first embodiment.

Simulation Results for First Embodiment and Second Embodiment

To confirm the effect of the above two transmission power distribution methods, simulation is performed to analyze how the error rate has improved. The parameters used in the simulation will be described below. The error correction coder 15 used any one of the coding rate of ½, ⅔ and ¾ for a convolutional code with a constraint length of 7. The interleave processor 16 used a depth of 48. The subcarrier modulators 18$_1$ to 18$_L$ used any one of BPSK, QPSK, 16QAM and 64QAM. The fading attenuation αi generated in each subcarrier on the transmission line was assumed to follow the Reyleigh distribution ($\sigma=\sqrt{½}$).

Figure 7A:
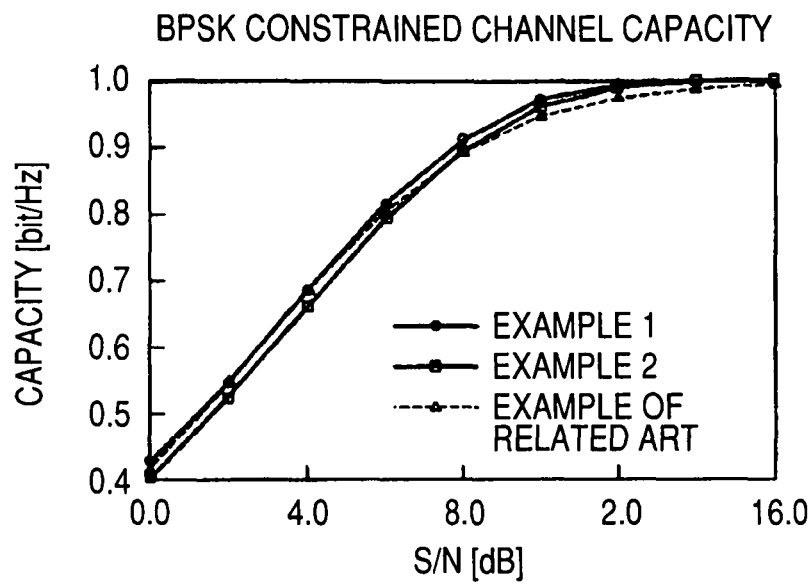
FIG. 7A) is a graph illustrating BPSK channel capacity for the embodiments relative to the related art for a range of relative signal strengths.
Figure 7B:
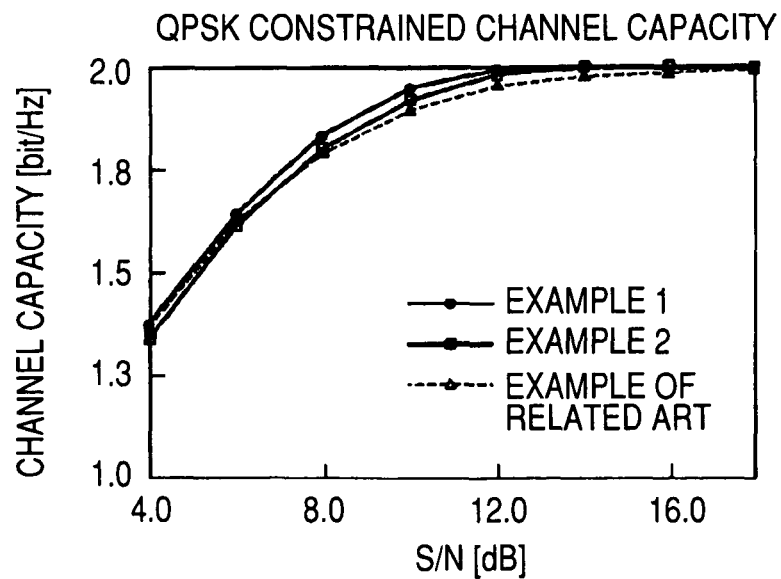
FIG. 7B) is a graph illustrating QPSK channel capacity for the embodiments relative to the related art for a range of relative signal strengths.
Figure 7C:
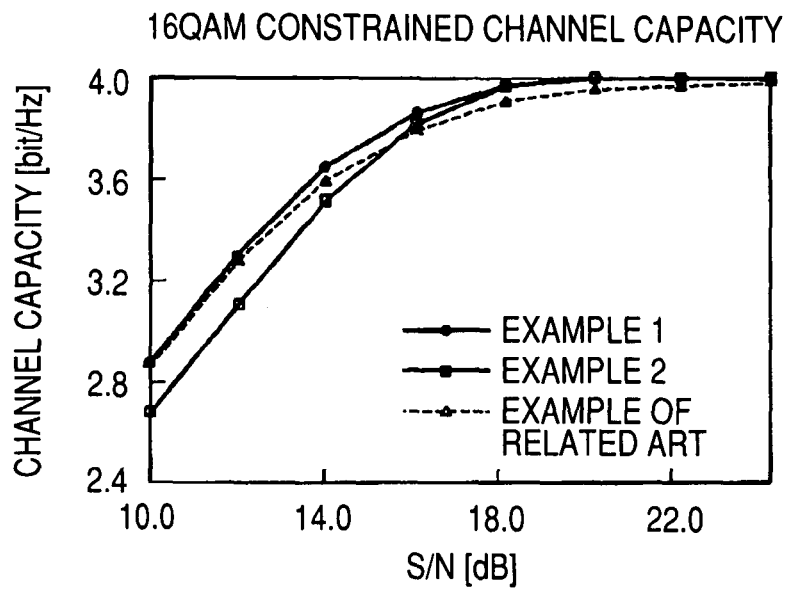
FIG. 7C) is a graph illustrating 16QAM channel capacity for the embodiments relative to the related art for a range of relative signal strengths.
Figure 7D:
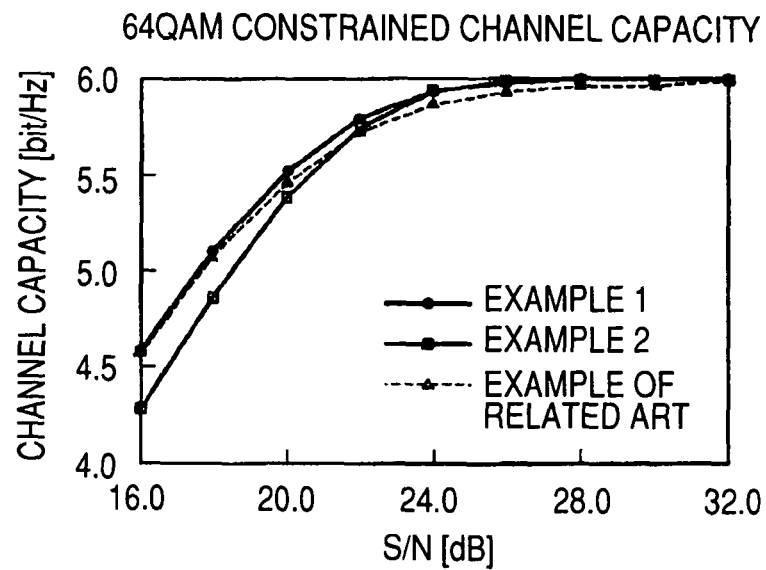
FIG. 7D) is a graph illustrating 64QAM channel capacity for the embodiments relative to the related art for a range of relative signal strengths.

FIGS. 7A and 7B show the amount of limited mutual information when the power distribution control over each subcarrier according to the first or second embodiment is implemented. It can be seen that by implementing the power distribution control according to the first or second embodiment, the amount of limited mutual information is increased compared to that conventionally achieved for every modulation method.

Figure 8A:
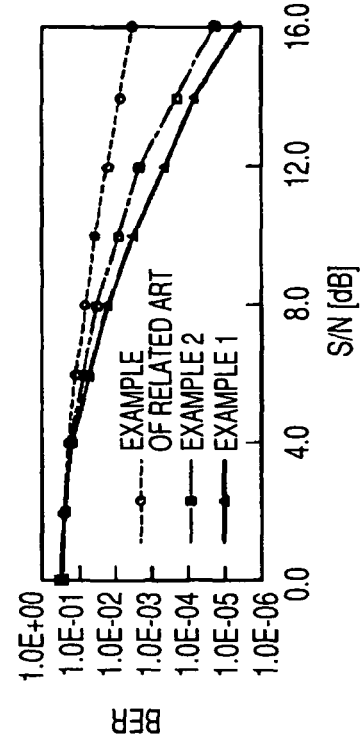
FIG. 8A) is a graph illustrating Bit Error Rate in BPSK for the embodiments relative to the related art for a range of relative signal strengths.
Figure 8B:
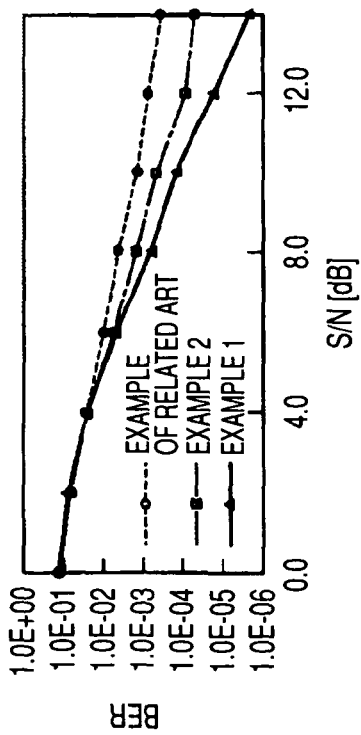
FIG. 8B) is a graph illustrating Bit Error Rate in BPSK for the embodiments relative to the related art for a range of relative signal strengths.
Figure 8C:
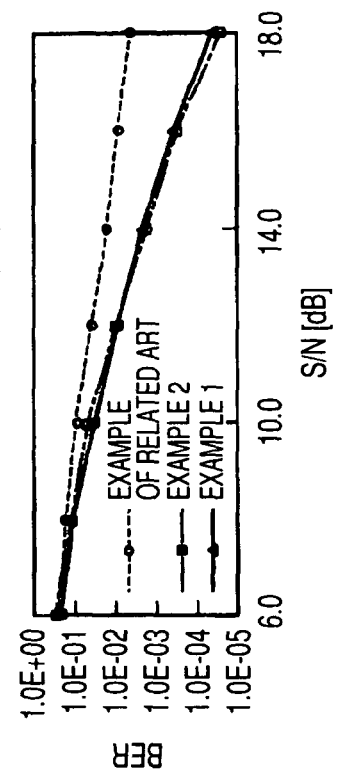
FIG. 8C) is a graph illustrating Bit Error Rate in QPSK for the embodiments relative to the related art for a range of relative signal strengths.
Figure 8D:
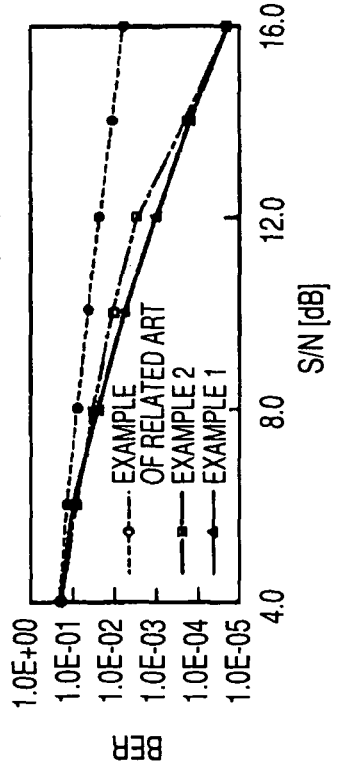
FIG. 8D) is a graph illustrating Bit Error Rate in QPSK for the embodiments relative to the related art for a range of relative signal strengths.
Figure 8E:
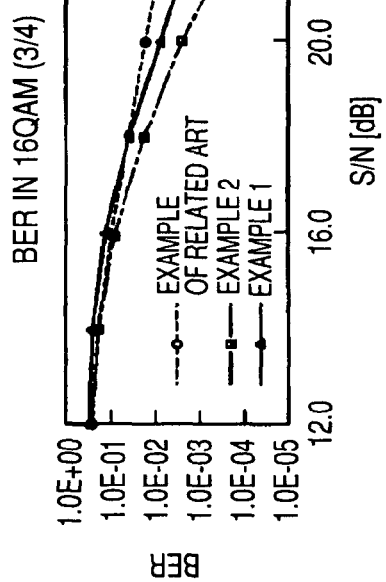
FIG. 8E) is a graph illustrating Bit Error Rate in 16QAM for the embodiments relative to the related art for a range of relative signal strengths.
Figure 8F:
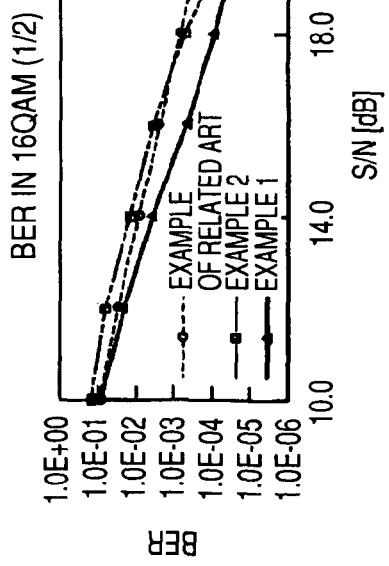
FIG. 8F) is a graph illustrating Bit Error Rate in 16QAM for the embodiments relative to the related art for a range of relative signal strengths.
Figure 8G:
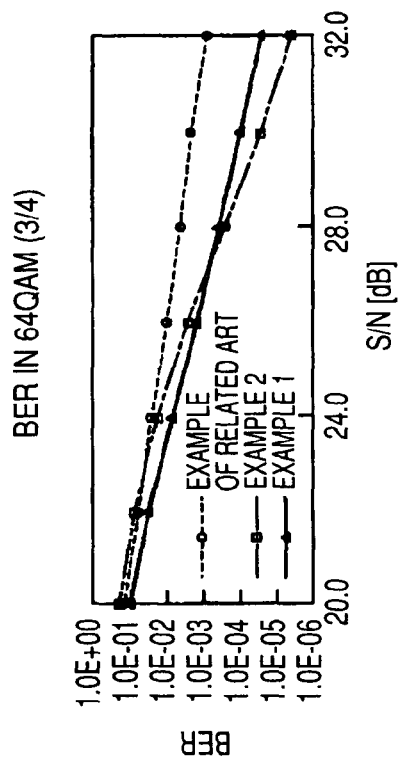
FIG. 8G) is a graph illustrating Bit Error Rate in 64QAM for the embodiments relative to the related art for a range of relative signal strengths.
Figure 8H:
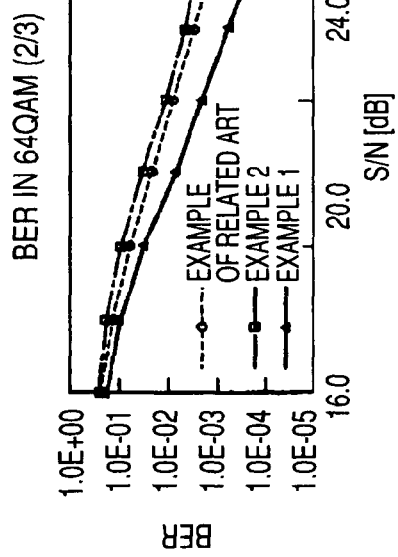
FIG. 8H) is a graph illustrating Bit Error Rate in 64QAM for the embodiments relative to the related art for a range of relative signal strengths.
Figure 9:
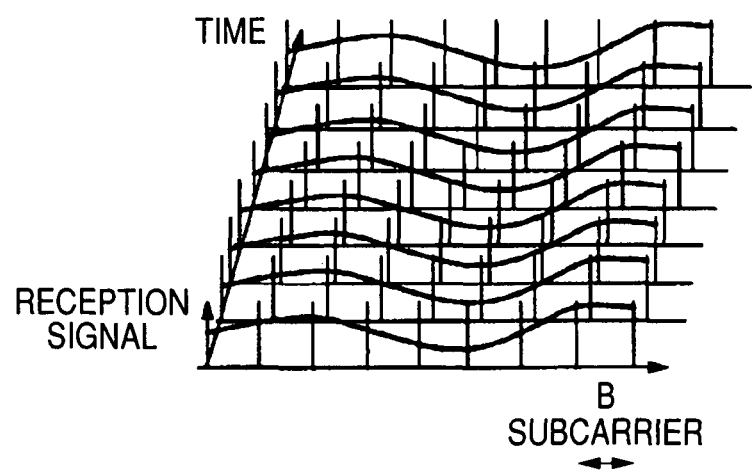
FIG. 9 illustrates an example of frequency selective fading.

FIGS. 8A and 8B show BER when the power distribution control over each subcarrier according to the first or second embodiment is implemented. It can be seen that by implementing the power distribution control according to the first or second embodiment, BER is improved compared to that conventionally achieved for every modulation method including an error correction code rate.

As described above, the invention can be applied to improve the error rate characteristic without increasing the transmission power even on the transmission line where multipath is present. Therefore, communication is possible over wider area even in an environment where a large amount of multipath is present and a large amount of signal attenuation is generated.

The transmission line measuring section 12 and the computation processor 13 that calculates the transmission power distribution to each subcarrier in the wireless communication apparatus 10 can be implemented without changing the protocol, such as the existing wireless LAN and Wimax, so that the compatibility with network systems of related art can be maintained.

In TPC (Transmit Power Control) defined in the conventional IEEE 802.11h, the transmission power needs to be set to the lowest possible level according to the loss generated along the transmission line in order to minimize power consumption, while when this standard is applied to a communication environment where multipath is present, higher transmission power needs to be set in order to compensate for an error caused by deep fading. However, the invention can be applied to accommodate deep fading in a lower transmission power setting. Accordingly, in combination with TPC, more effective power saving control can be realized.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless communication apparatus that transmits and receives an orthogonal frequency division multiplexing signal to communicate with a communication counterpart, the wireless communication apparatus comprising:
   measurement means for measuring a signal level of each subcarrier of a reception signal received from the communication counterpart;
   calculation means for calculating a predicted signal level of each subcarrier when the communication counterpart receives each subcarrier and calculating an increase/decrease ratio multiplier for a transmission power of each subcarrier such that an average amount of constrained channel capacity for information that is transmitted by a selected modulation method is maximized based on the predicted signal level; and
   transmission parameter control means for controlling transmission parameters including the increase/decrease ratio multiplier of transmission power for each subcarrier calculated by the calculation means, and further wherein an optimum modulation method, error correction code rate and output power are determined using a table of values such that the total power for all subcarriers is not increased, wherein the calculation means uses the following equation (1) to identify a subcarrier i in which the increase/decrease ratio multiplier Pti of the transmission power is zero, and uses predicted signal level γi of every other subcarrier i to recalculate the following equation (1) so as to calculate the increase/decrease ratio multiplier Pti of the transmission power for each subcarrier i of the signal;

$$Pt_i = \frac{\log(\gamma_i^{h_M})}{m_M \cdot \gamma_i^{h_M}} - \frac{\sum_{i=1}^{N} \frac{\log(\gamma_i^{h_M})}{m_M \cdot \gamma_i^{h_M}} - N}{\sum \frac{1}{\gamma_i^{h_M}}} \cdot \frac{1}{\gamma_i^{h_M}} \quad (1)$$

where M is a constellation number, and mM and hM are coefficients that depend on M, and where N is the number of subcarriers.

2. The wireless communication apparatus according to claim 1, wherein the measurement means measures
   a packet error rate of the reception signal received from the communication counterpart, and
   the calculation means corrects an average amount of signal attenuation based on a comparison result of the packet error rate measured by the measurement means and a predicted packet error rate when the communication counterpart receives the signal, and corrects the predicted signal level based on the average amount of attenuation.

3. A wireless communication method for transmitting and receiving an orthogonal frequency division multiplexing signal to communicate with a communication counterpart, the wireless communication method comprising:

measuring a signal level of each subcarrier of a reception signal received from the communication counterpart;

calculating a predicted signal level of each subcarrier when the communication counterpart receives the subcarrier of the reception signal and calculating an increase/decrease ratio multiplier for a transmission power of each subcarrier such that an average amount of constrained channel capacity is maximized based on the predicted signal level; and controlling transmission parameters including the increase/decrease ratio multiplier of transmission power for each subcarrier calculated at the calculating step, and further wherein an optimum modulation method, error correction code rate and output power are determined using a table of values such that the total power for all subcarriers is not increased, wherein the step of calculating uses the following equation (1) to identify a subcarrier i in which the increase/decrease ratio multiplier $Pt_i$ of the transmission power is zero, and uses predicted signal level $\gamma_i$ of every other subcarrier i to recalculate the following equation (1) so as to calculate the increase/decrease ratio multiplier $Pt_i$ of the transmission power for each subcarrier i of the signal;

$$Pt_i = \frac{\log(\gamma_i^{h_M})}{m_M \cdot \gamma_i^{h_M}} - \frac{\sum_{i=1}^{N} \frac{\log(\gamma_i^{h_M})}{m_M \cdot \gamma_i^{h_M}} - N}{\sum \frac{1}{\gamma_i^{h_M}}} \cdot \frac{1}{\gamma_i^{h_M}} \quad (1)$$

where M is a constellation number, and mM and hM are coefficients that depend on M, and where N is the number of subcarriers.

4. A wireless communication apparatus that transmits and receives an orthogonal frequency division multiplexing signal to communicate with a communication counterpart, the wireless communication apparatus comprising:

a measuring unit measuring a signal level of each subcarrier of a reception signal received from the communication counterpart;

a calculator calculating a predicted signal level of each subcarrier when the communication counterpart receives the subcarrier of the reception signal and calculating an increase/decrease ratio multiplier for a transmission power of each subcarrier such that an average amount of constrained channel capacity is maximized based on the predicted signal level; and a transmission parameter controller controlling transmission parameters including the increase/decrease ratio multiplier of transmission power for each subcarrier calculated by the calculator, and further wherein an optimum modulation method, error correction code rate and output power are determined using a table of values such that the total power for all subcarriers is not increased, wherein the calculator uses the following equation (1) to identify a subcarrier i in which the increase/decrease ratio multiplier $Pt_i$ of the transmission power is zero, and uses predicted signal level $\gamma_i$ of every other subcarrier i to recalculate the following equation (1) so as to calculate the increase/decrease ratio multiplier $Pt_i$ of the transmission power for each subcarrier i of the signal;

$$Pt_i = \frac{\log(\gamma_i^{h_M})}{m_M \cdot \gamma_i^{h_M}} - \frac{\sum_{i=1}^{N} \frac{\log(\gamma_i^{h_M})}{m_M \cdot \gamma_i^{h_M}} - N}{\sum \frac{1}{\gamma_i^{h_M}}} \cdot \frac{1}{\gamma_i^{h_M}} \quad (1)$$

where M is a constellation number, and mM and hM are coefficients that depend on M, and where N is the number of subcarriers.

* * * * *